(12) United States Patent
McPheeters et al.

(10) Patent No.: US 10,205,419 B2
(45) Date of Patent: Feb. 12, 2019

(54) RAILLESS SOLAR MODULE INSTALLATION SYSTEMS AND DEVICES

(71) Applicant: SUNRUN SOUTH LLC, San Luis Obispo, CA (US)

(72) Inventors: Greg McPheeters, Santa Cruz, CA (US); Geno Viscuso, Santa Cruz, CA (US); Brian Peterson, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 15/474,519

(22) Filed: Mar. 30, 2017

(65) Prior Publication Data

US 2018/0287550 A1    Oct. 4, 2018

(51) Int. Cl.
*H02S 20/30*      (2014.01)
*H02S 30/10*      (2014.01)

(52) U.S. Cl.
CPC .............. *H02S 20/30* (2014.12); *H02S 30/10* (2014.12)

(58) Field of Classification Search
CPC .................................. H02S 20/30; H02S 30/10
USPC ........................ 52/58, 60, 27, 173.3, 62, 698
See application file for complete search history.

(56) References Cited

U.S. PATENT DOCUMENTS

| | | | | |
|---|---|---|---|---|
| 5,571,338 A * | 11/1996 | Kadonome | ........... | E04D 3/3608 136/251 |
| 5,762,720 A * | 6/1998 | Hanoka | ........... | B32L 317/10018 136/251 |
| 6,360,491 B1 * | 3/2002 | Ullman | ................ | E04D 13/12 248/156 |
| 7,435,134 B2 * | 10/2008 | Lenox | ................ | F24J 2/5245 439/567 |
| 7,694,466 B2 * | 4/2010 | Miyamoto | ........... | F24J 2/5207 126/623 |
| 7,915,519 B2 * | 3/2011 | Kobayashi | ........... | F24J 2/5211 126/623 |
| 8,375,654 B1 * | 2/2013 | West | ................. | F24J 2/5211 126/623 |
| 8,640,401 B2 * | 2/2014 | Hong | ................. | F24J 2/5205 248/230.2 |
| 8,752,338 B2 * | 6/2014 | Schaefer | ........... | F24J 2/5245 52/173.3 |
| 8,763,322 B2 * | 7/2014 | Hamamura | ........ | F24J 2/5245 52/173.3 |
| 8,919,052 B2 * | 12/2014 | West | ................. | F24J 2/5211 52/173.3 |

(Continued)

*Primary Examiner* — Joshua K Ihezie
(74) *Attorney, Agent, or Firm* — Kramer Levin Naftalis & Frankel LLP

(57) ABSTRACT

Devices and system for installing solar modules for the generation of solar power are disclosed. One device could be a mid-mount assembly having a module sleeve coupled to a module sleeve adapter for engaging boundary surfaces of one solar module. A second device could be an end-mount assembly having a top structure engaged with a bottom structure to form two sides, one side for engaging boundary surfaces of one solar module and the other for engaging a module sleeve on a second side. The solar modules installation system could include a plurality of the solar panels, a plurality of end-mount assemblies and mid-mount assemblies, and a plurality of base assemblies coupled to the plurality of end-mount assemblies and mid-mount assemblies.

19 Claims, 18 Drawing Sheets

(56) References Cited

U.S. PATENT DOCUMENTS

| | | | | |
|---|---|---|---|---|
| 8,938,932 B1* | 1/2015 | Wentworth | | H02S 20/23 52/173.3 |
| 8,984,818 B2* | 3/2015 | McPheeters | | F24J 2/5205 52/173.3 |
| 9,134,044 B2* | 9/2015 | Stearns | | F24J 2/5245 |
| 9,422,721 B2* | 8/2016 | Stearns | | E04D 13/10 |
| 2003/0070368 A1* | 4/2003 | Shingleton | | F24J 2/5205 52/173.3 |
| 2003/0101662 A1* | 6/2003 | Ullman | | E04D 13/12 52/27 |
| 2008/0302407 A1* | 12/2008 | Kobayashi | | F24J 2/5211 136/251 |
| 2009/0282755 A1* | 11/2009 | Abbott | | F16B 2/185 52/173.3 |
| 2010/0269447 A1* | 10/2010 | Schuit | | F24J 2/5205 52/698 |
| 2011/0203637 A1* | 8/2011 | Patton | | F24J 2/5205 136/244 |
| 2011/0232222 A1* | 9/2011 | McPheeters | | E04D 13/1476 52/698 |
| 2011/0239546 A1* | 10/2011 | Tsuzuki | | F24J 2/4614 52/11 |
| 2012/0073220 A1* | 3/2012 | Kobayashi | | E04D 1/30 52/173.3 |
| 2012/0117895 A1* | 5/2012 | Li | | F24J 2/5205 52/173.3 |
| 2013/0340358 A1* | 12/2013 | Danning | | B23P 11/00 52/126.7 |
| 2014/0109496 A1* | 4/2014 | Stapleton | | E04D 13/00 52/173.3 |
| 2014/0137489 A1* | 5/2014 | Habdank | | F24J 2/5207 52/173.3 |
| 2015/0034355 A1* | 2/2015 | Patton et al. | | F24J 2/5245 174/78 |
| 2015/0107168 A1* | 4/2015 | Kobayashi | | F24J 2/5245 52/173.3 |
| 2015/0280638 A1* | 10/2015 | Stephan | | H02S 20/23 52/173.3 |
| 2016/0112000 A1* | 4/2016 | McPheeters | | H02S 20/23 52/698 |
| 2016/0134229 A1* | 5/2016 | Hsueh | | H02S 20/23 52/173.3 |
| 2017/0040931 A1* | 2/2017 | Schuit | | F16H 25/20 |
| 2017/0155356 A1* | 6/2017 | Schuit | | H02S 20/23 |

* cited by examiner

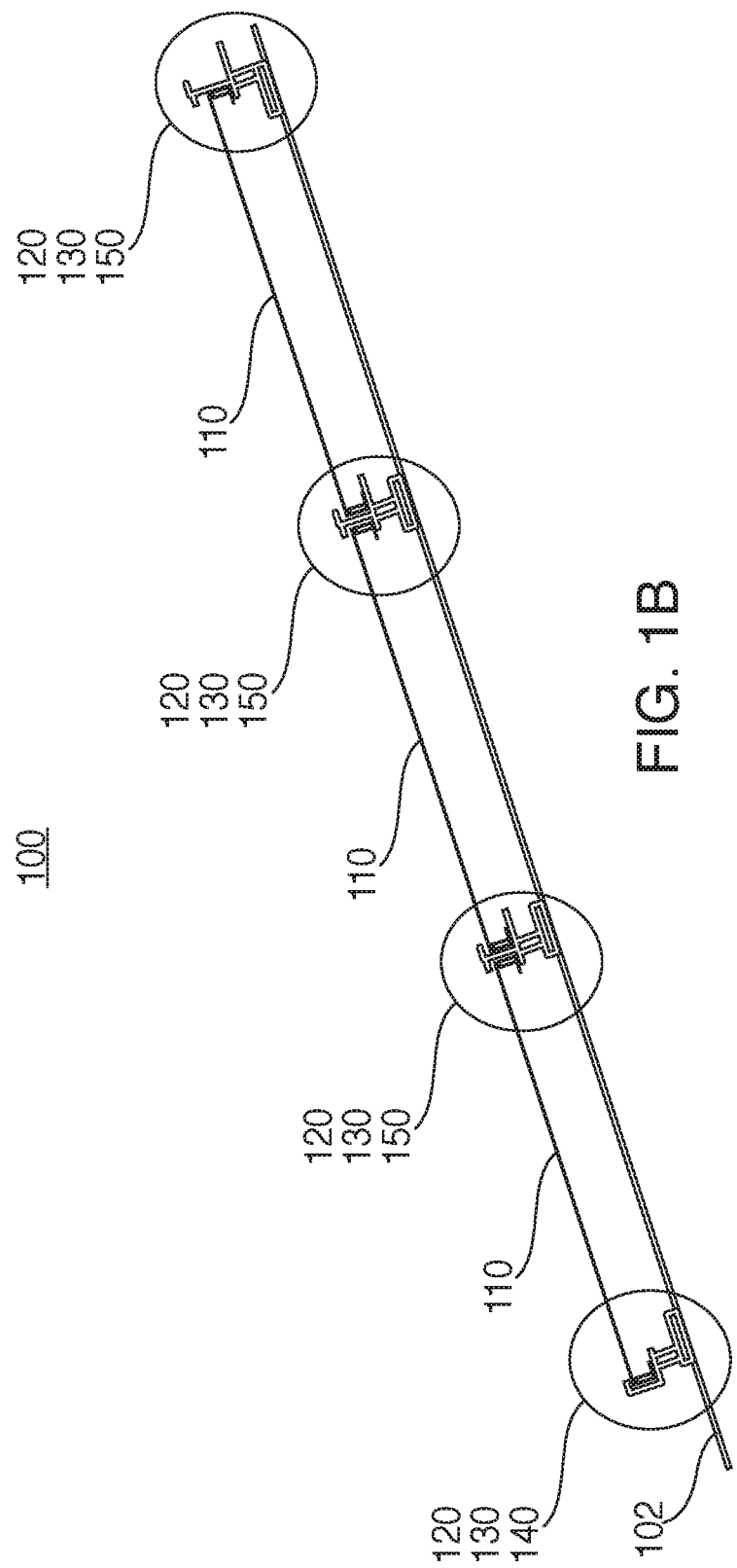

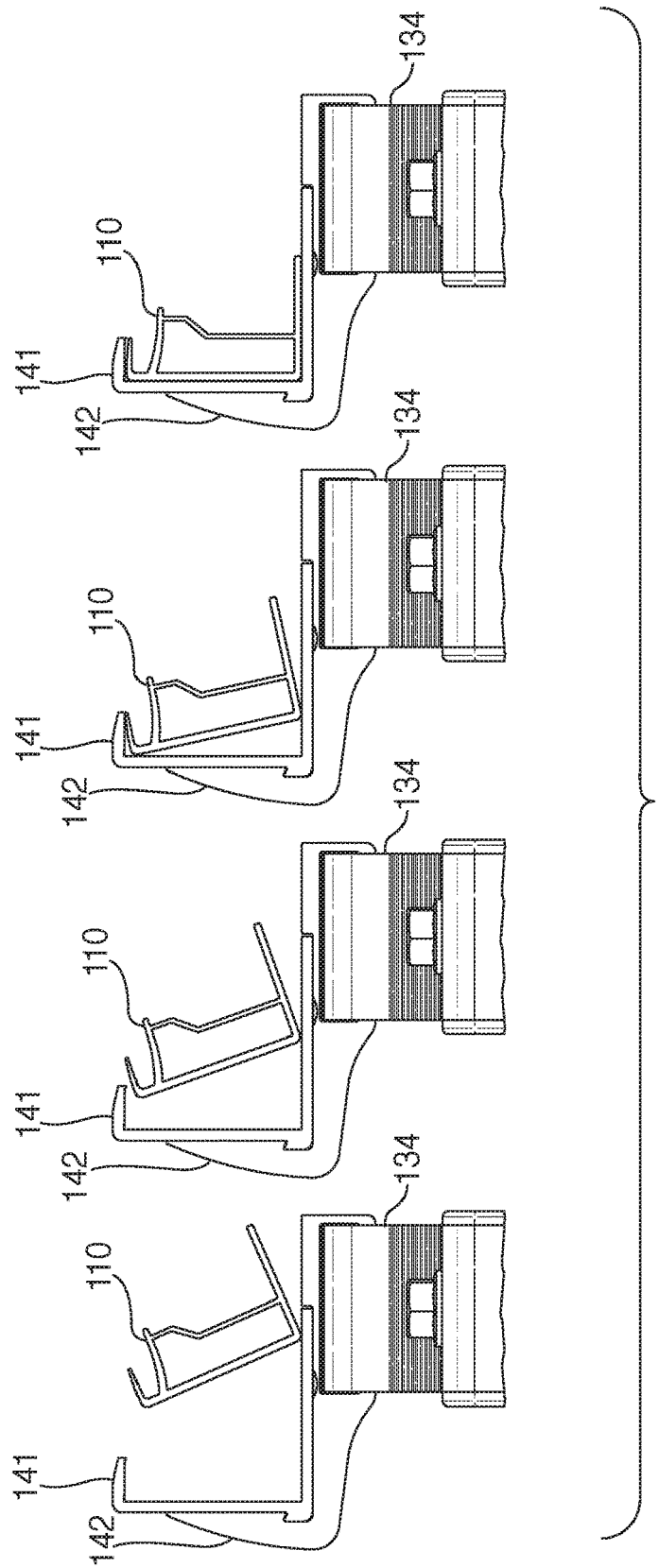

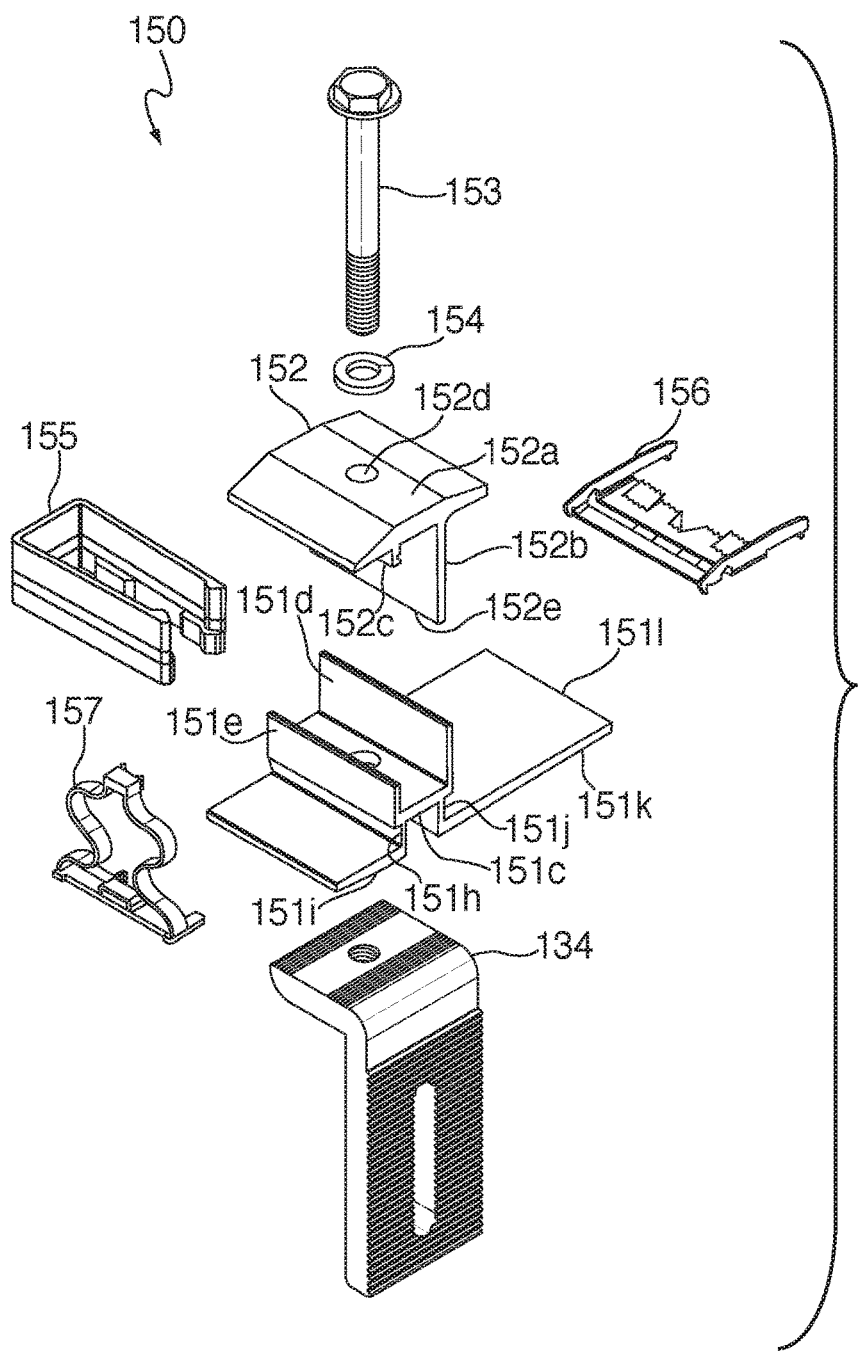

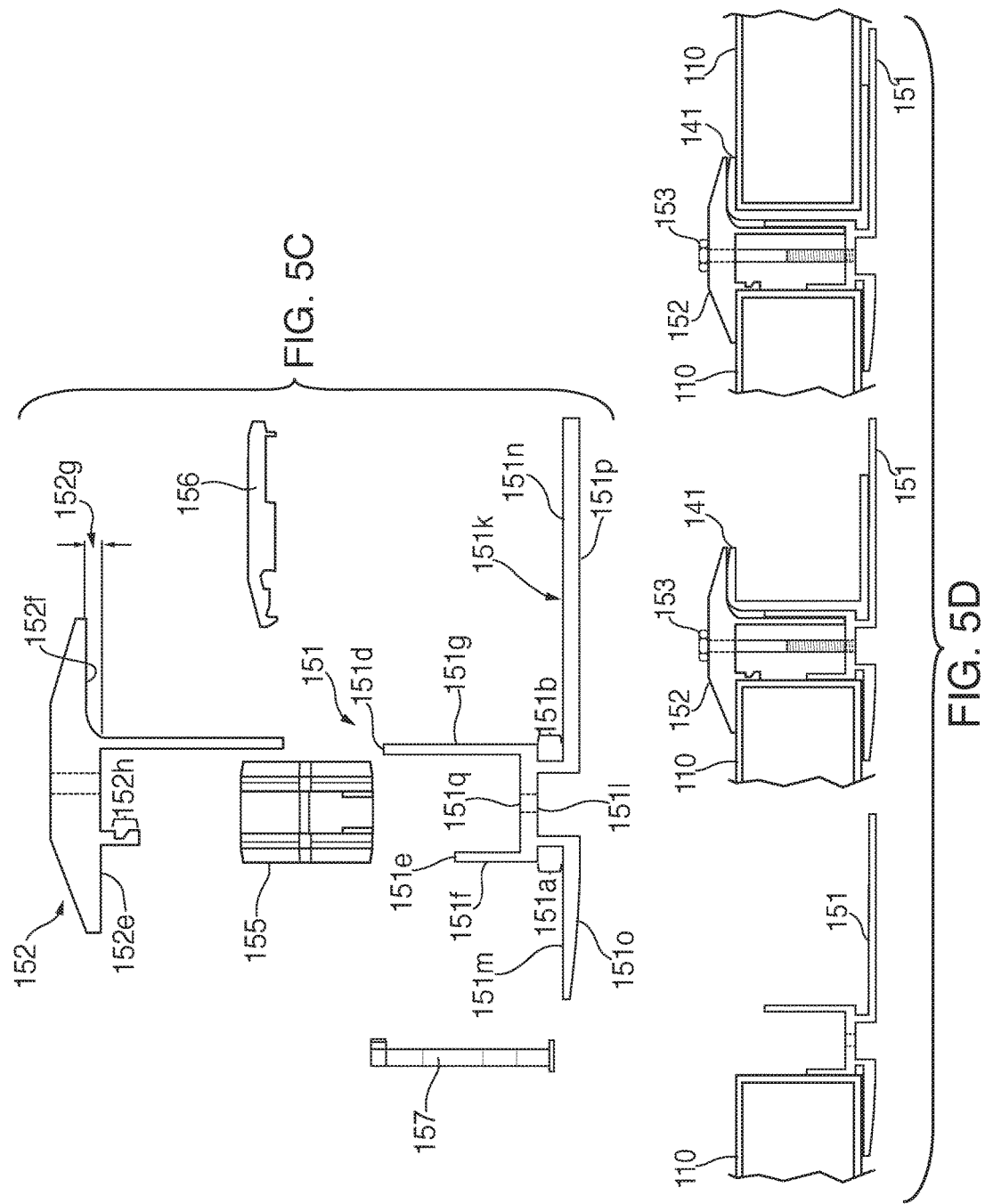

RAILLESS SOLAR MODULE INSTALLATION SYSTEMS AND DEVICES

BACKGROUND

Solar module installations typically require framed solar modules, or modules, mounted on complex base structures assembled from posts, rails, clamps, and other fasteners. A significant portion of the cost of these solar module installations may be attributed to the rails, which are often very long extruded or roll-formed members. Aside from the cost of manufacturing the rails, their considerable length can add to the cost of shipping materials to the installation site and add difficulty to the installation process. Accordingly, railless solar module installation systems could beneficially reduce the costs of manufacturing, shipping, and installing solar modules.

SUMMARY

Embodiments of the inventive concepts disclosed herein are directed to devices and a system for installing solar modules for the generation of solar power. The devices and system disclosed herein may include an array of solar modules suspended above an installation surface using a number of solar modules, base assemblies having flash track assemblies and height-adjustable track mounts, end-mount assemblies, and mid-mount assemblies.

In one aspect, embodiments of the inventive concepts disclosed herein are directed to a first device employed in an installation of solar modules. The device could include an end-mount assembly having a module sleeve coupled to a module sleeve adapter for engaging boundary surfaces of one solar module.

In a further aspect, embodiments of the inventive concepts disclosed herein are directed to a second device employed in an installation of solar modules. The device could include a mid-mount assembly having a top structure engaged with a bottom structure for engaging with boundary surfaces of one solar module and for engaging a module sleeve within which boundary surfaces of another solar module may be placed.

In a further aspect, embodiments of the inventive concepts disclosed herein are directed to a system employed in an installation of solar modules. The system could include a plurality of solar panels, a plurality of the preceding end-mount assemblies and mid-mount assemblies engaged with the plurality of solar panels, and a plurality of base assemblies coupled to the plurality of end-mount assemblies and mid-mount assemblies.

BRIEF DESCRIPTION OF THE DRAWINGS

FIG. 1B shows a schematic side view of a solar module installation system, in accordance with some embodiments;

FIG. 4E shows an installation sequence of a solar module placed on an end-mount assembly, in accordance with some embodiments;

FIG. 5B shows an exploded, perspective view of an mid-mount assembly, in accordance with some embodiments;

FIG. 5C shows a side view of end-mount assembly members, in accordance with some embodiments;

FIG. 5D shows a side view of end-mount assembly members facilitating an installation of a module sleeve, in accordance with some embodiments;

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
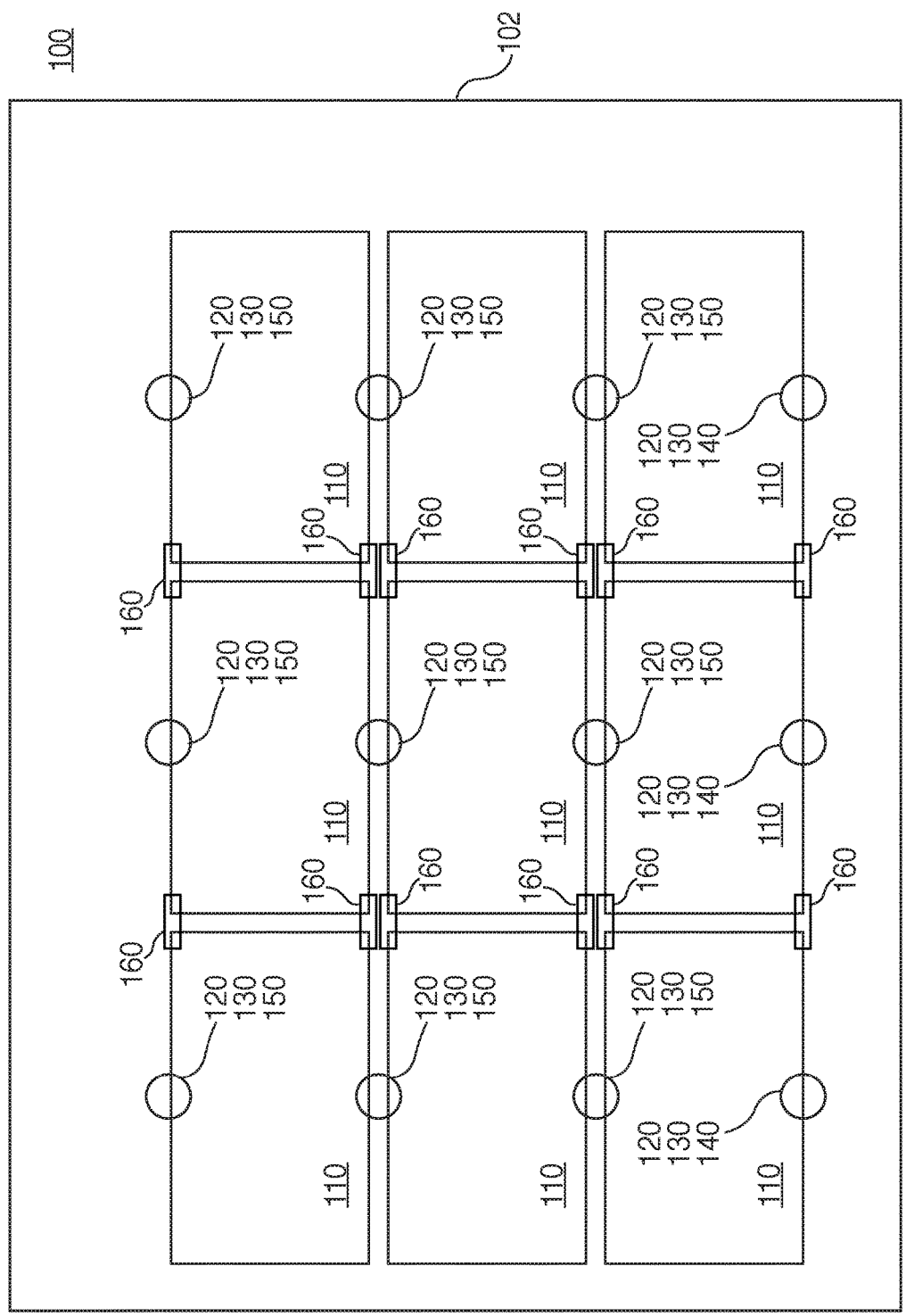
FIG. 1A shows a schematic top plan view of a solar module installation system, in accordance with some embodiments.

FIGS. 1A and 1B, show a schematic top plan and side views, respectively, of solar module installation system 100, in accordance with some embodiments. Solar module installation system 100 includes flash track assemblies 120, height-adjustable base assemblies 130, end-mount assemblies 140, and mid-mount assemblies 150 for supporting an array of array of solar modules 110 installed above an installation surface 102. Solar modules 110 can each include an array of electricity-generating solar cells covered with a protectant material such as tempered glass or a laminate material, for example. Although solar modules 110 are commonly rectangular-shaped structures with four corners, other shapes are possible and explicitly contemplated for use with the embodiments of the inventive concepts disclosed herein.

Solar modules 110 may be attached to one another at or near their corners using module links 160, which transform individual solar module frames into system-wide structural members that help spread local loads throughout the system, thereby reducing or eliminating the need for separate mounting rails. The module links may be attached to two or more solar modules and secured in place using rotatable clamping members 162. In some embodiments, solar module installation system 100 may alternatively utilize the module links disclosed by McPheeters in U.S. patent application Ser. No. 14/819,397, entitled "Solar Panel Installation Systems and Methods", which is incorporated by reference herein in its entirety. As disclosed therein, module links 140 may attach to the frames of solar modules 110 to provide structural coupling between the any two edgewise adjacent solar modules 110 or all four adjacent solar modules at each interior intersection and between two edgewise adjacent solar modules 110 at each edge intersection.

Figure 1C:
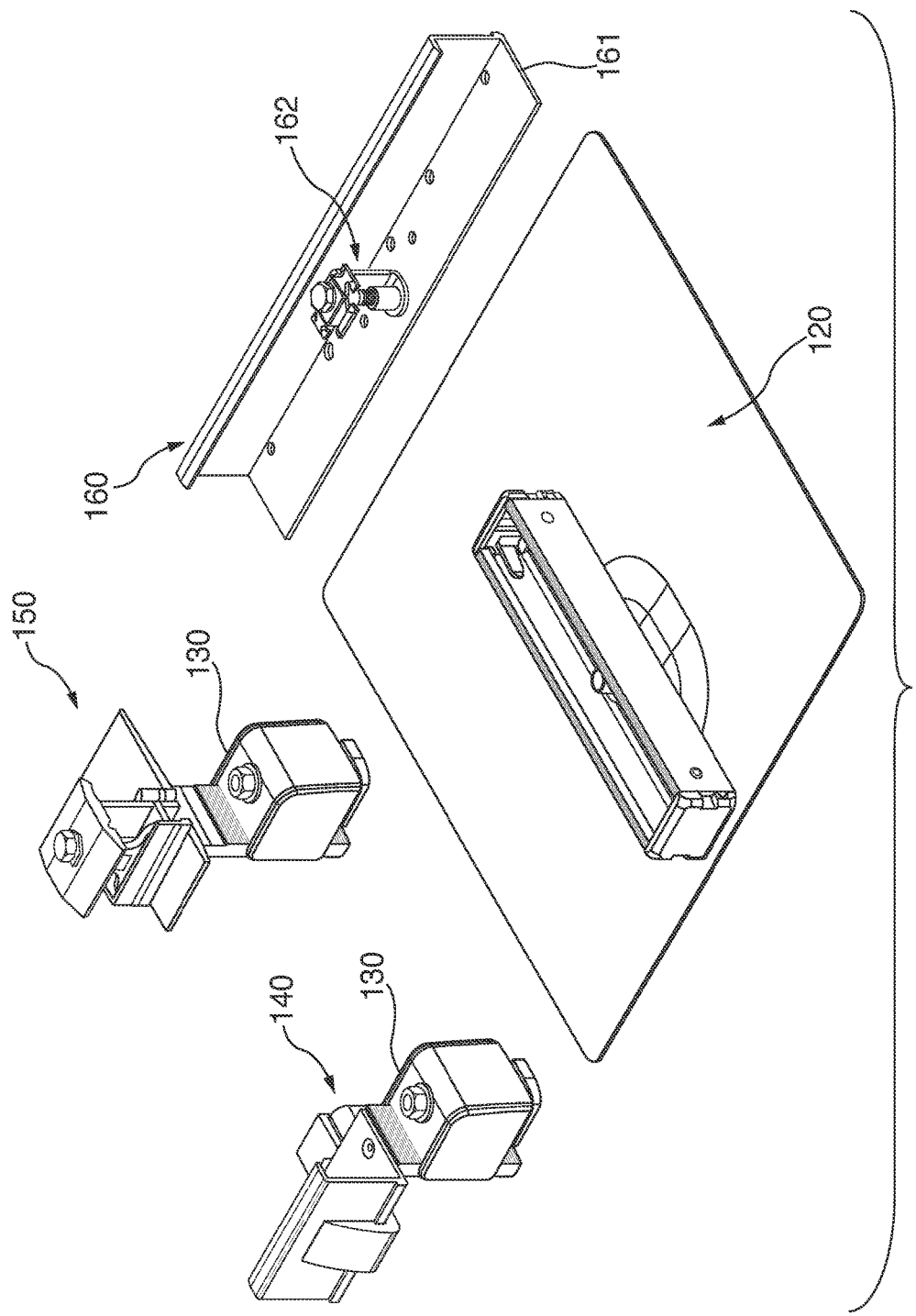
FIG. 1C shows perspective views of a flash track assembly, height-adjustable base assembly, end-mount assembly, and mid-mount assembly, in accordance with some embodiments.

FIG. 1C shows a disassembled perspective view of flash track assembly 120, height-adjustable base assemblies 130, end-mount assembly 140, and mid-mount assembly 150. As described in detail below, flash track 122 of flash track assembly 120 is oriented perpendicularly to the slope of installation surface 102 to allow for the longitudinal repositioning of mid-mount assemblies 150 during installation of solar modules 110. Height-adjustable base assemblies 130 are height adjustable to ensure that the solar modules are level even if installed on an uneven installation surface. End-mount assemblies 140 is coupled to height-adjustable base assembly 130 to support one or more solar modules at the edge of an array, while mid-mount assembly 150 is coupled to height-adjustable base assembly 130 to support two or more solar modules at interior locations in the array. In some embodiments, flash track assembly includes flashing 121 interposed between flash track 122 and the installation surface.

Figure 1D:
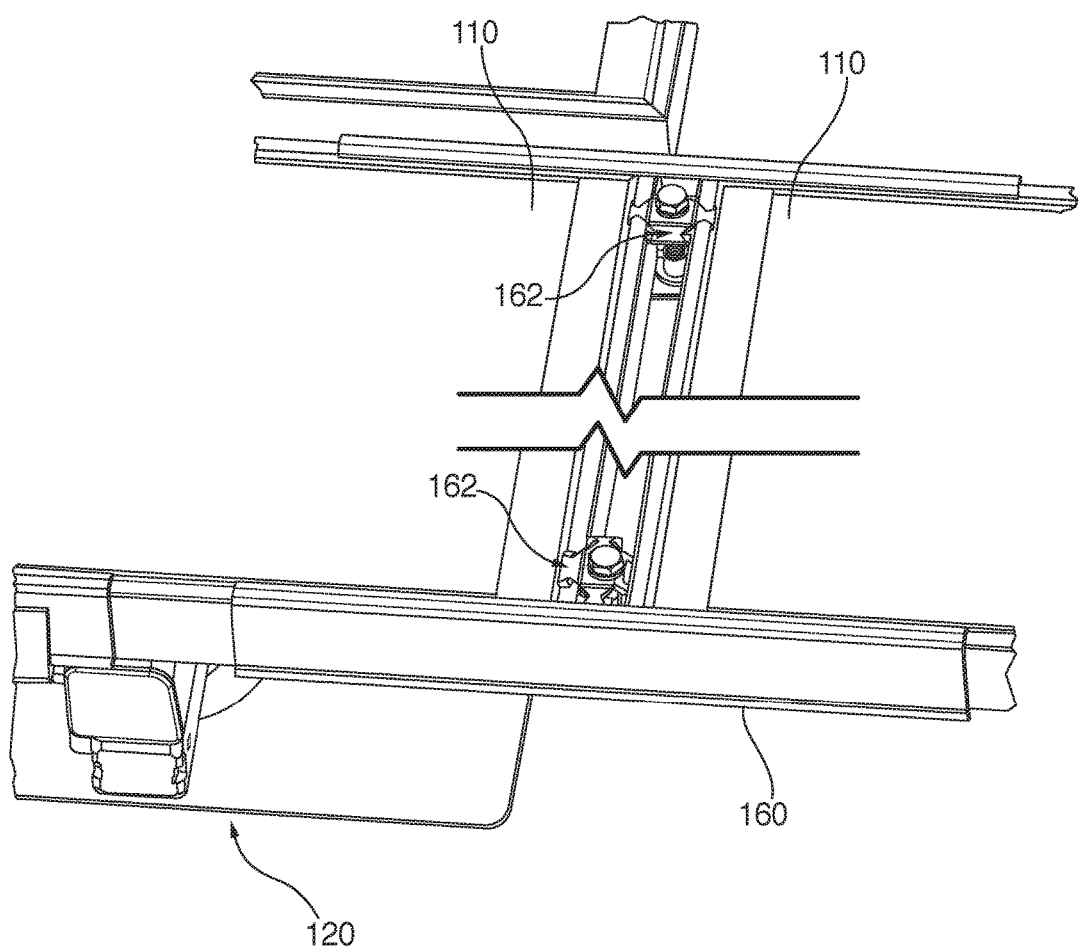
FIG. 1D shows a perspective view of a railless solar module installation system, in accordance with some embodiments.

FIG. 1D shows a perspective view of railless solar module installation system 100, in accordance with some embodiments. In particular, FIG. 1D illustrates how module links 160 structurally couple together adjacent solar modules 110, which reduces or alleviates the need for long mounting rails to support the modules. In some embodiments, module link 160 includes rotating clamping member 162, which is configured to clamp down on one or two solar modules. When clamping a single solar module (as demonstrated by lower rotating clamping member 162), a clamping member located at the center of the clamp's T-formation, can be used to clamp down on the edge of a solar module (as shown in FIG. 1D). Clamping one solar module at a time in this way permits a second solar module to be slid into place while maintaining module link 160 in place relative to the first solar module. Once the second solar module is in place, rotating clamping member 162 can be rotated such that the clamping members located at the edges of the T-formation clamp down on the first and second solar modules simultaneously. When installed, rotating clamping member 162 maintains constant spacing between adjacent solar modules.

Figure 2A:
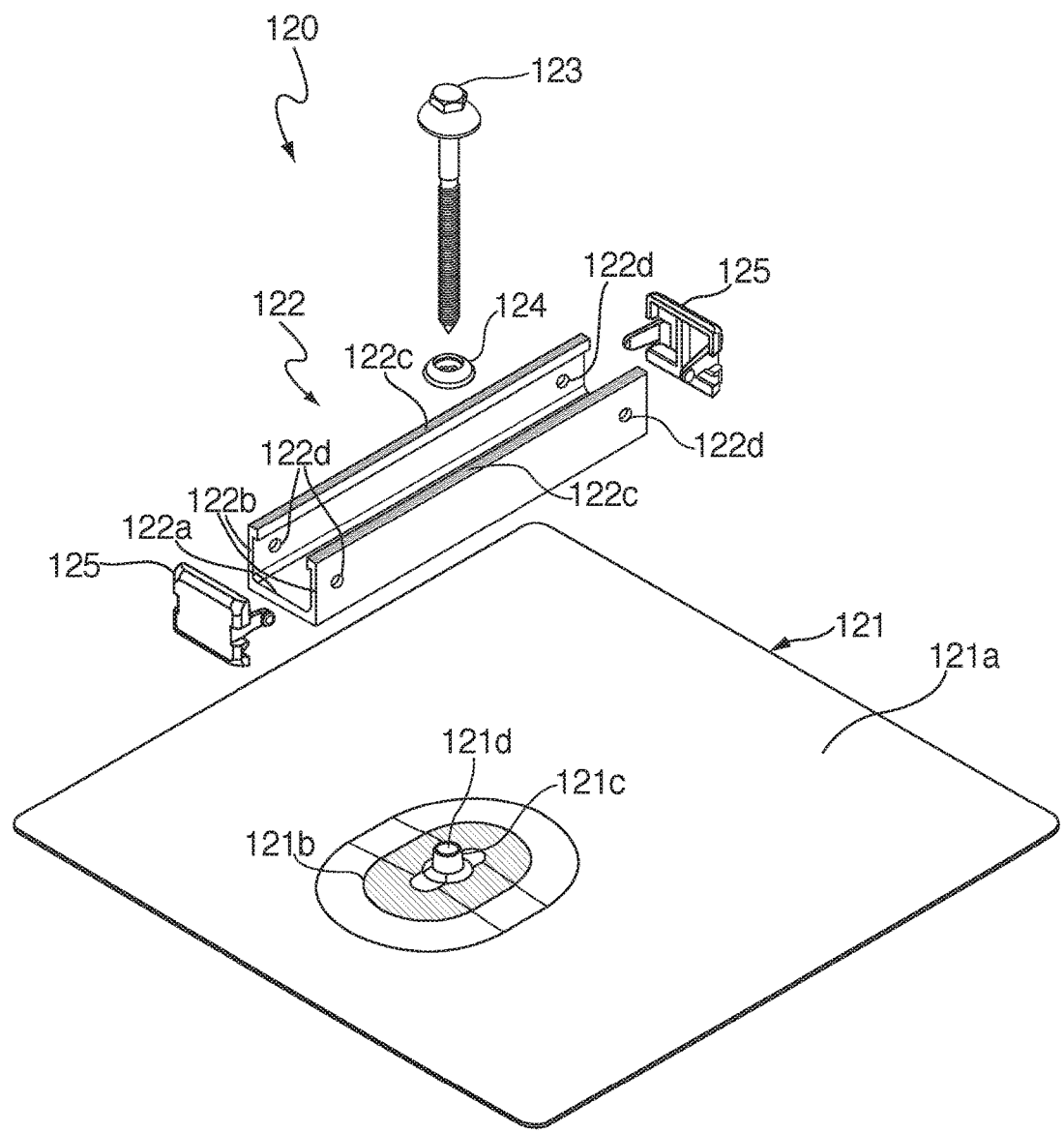
FIG. 2A shows an exploded view of a flash track assembly, in accordance with some embodiments.
Figure 2B:
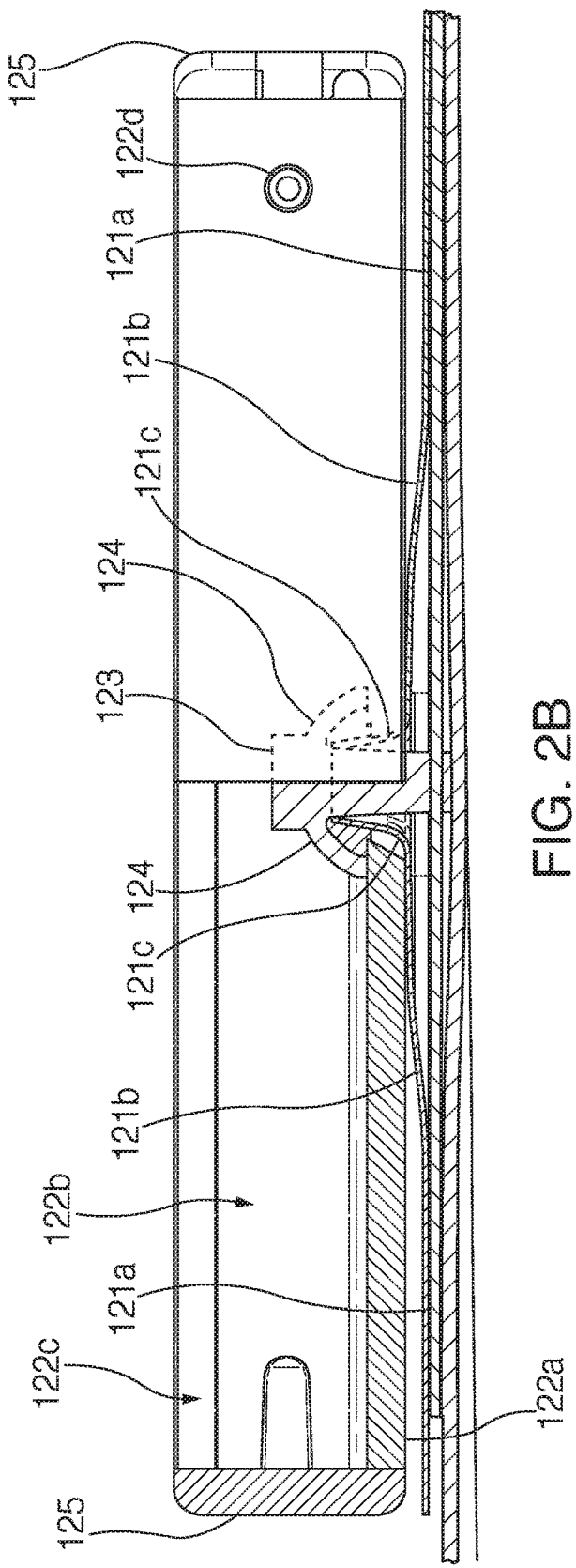
FIG. 2B shows a cross-sectional view of a flash track assembly, in accordance with some embodiments.
Figure 2C:
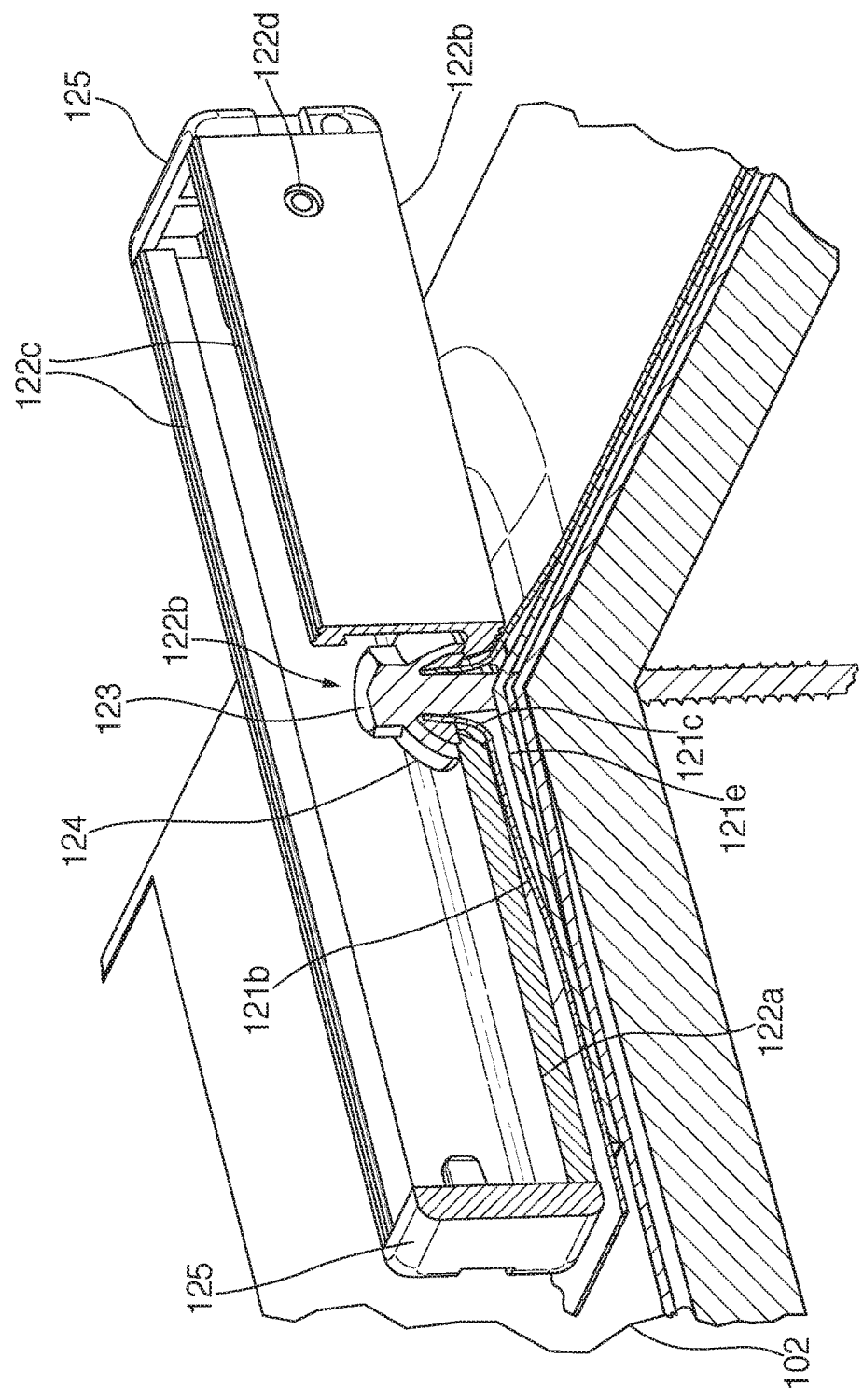
FIG. 2C shows a perspective cut-away view of a flash track assembly, in accordance with some embodiments.

FIGS. 2A-2C show exploded perspective, side cut-away, and perspective cut-away views of flash track assembly 120, in accordance with some embodiments. Flash track assembly 120 may be configured for installation on installation surface 102 and engagement of end-mount assembly 130. Flash track assembly 120 includes flashing 121, flash track 122, fastener 123, and gasket 124.

Figure 3A:
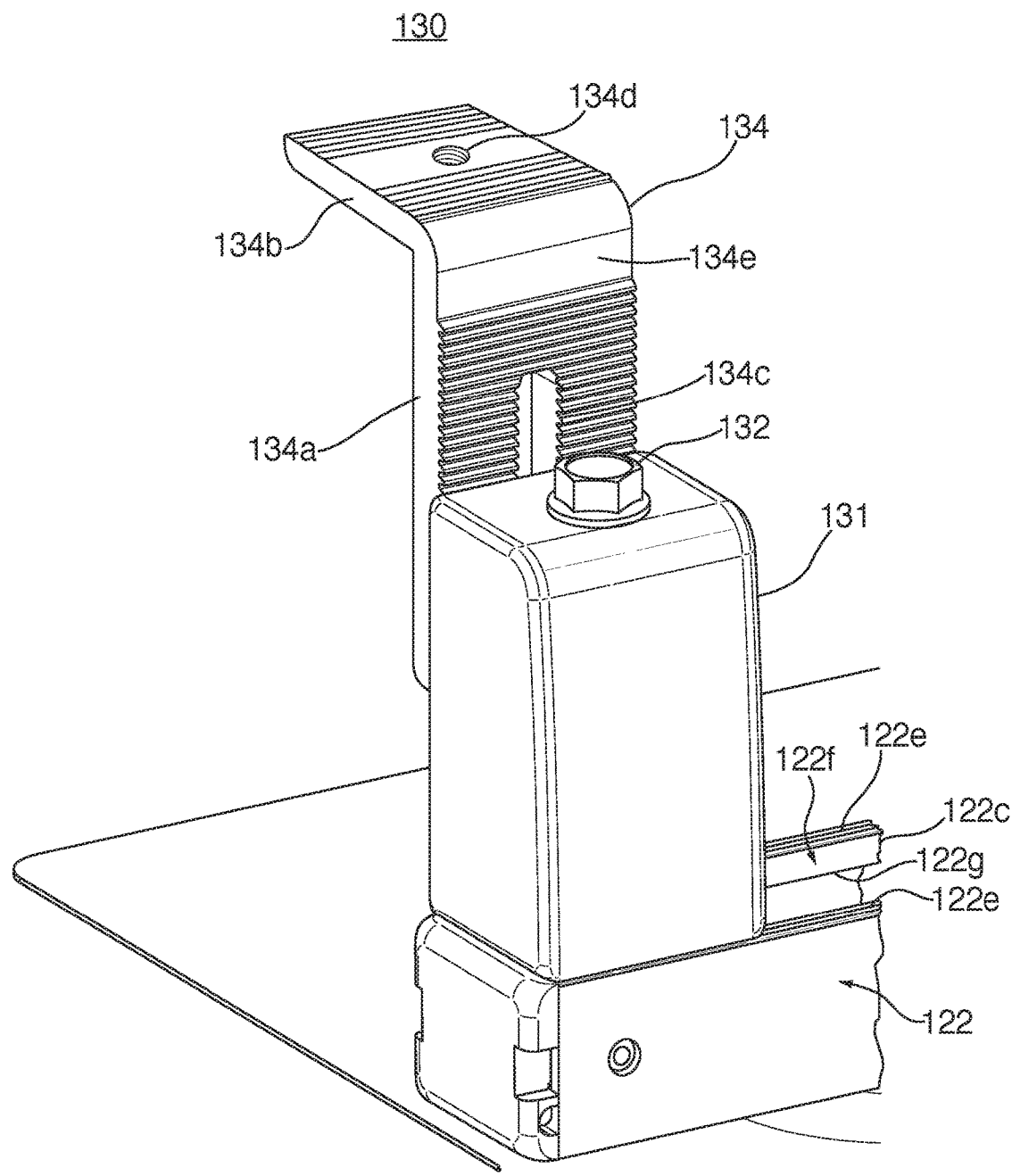
FIG. 3A shows a perspective view of a height-adjustable base assembly installed on a flash track assembly, in accordance with some embodiments.
Figure 3B:
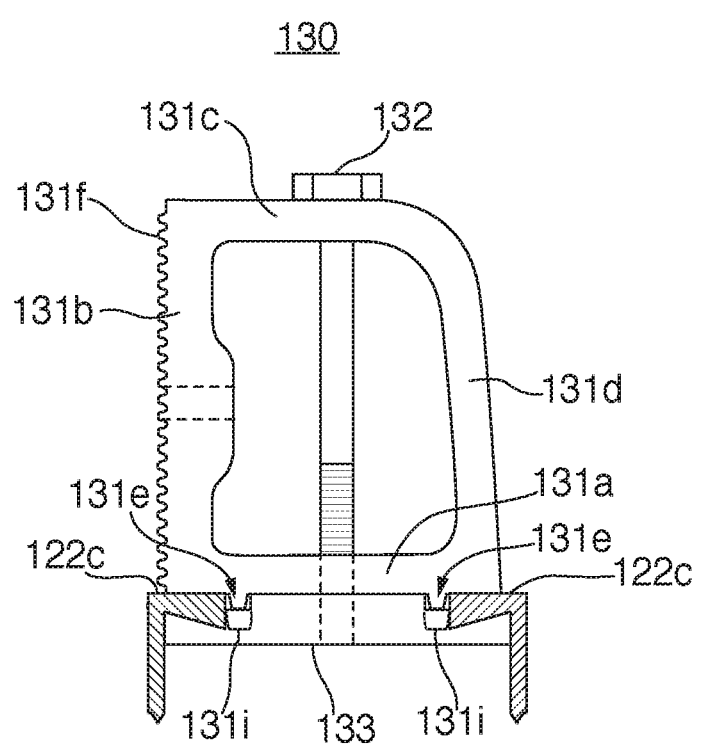
FIG. 3B shows a side cross-sectional view of a height-adjustable base assembly installed on a flash track assembly, in accordance with some embodiments.
Figure 4A:
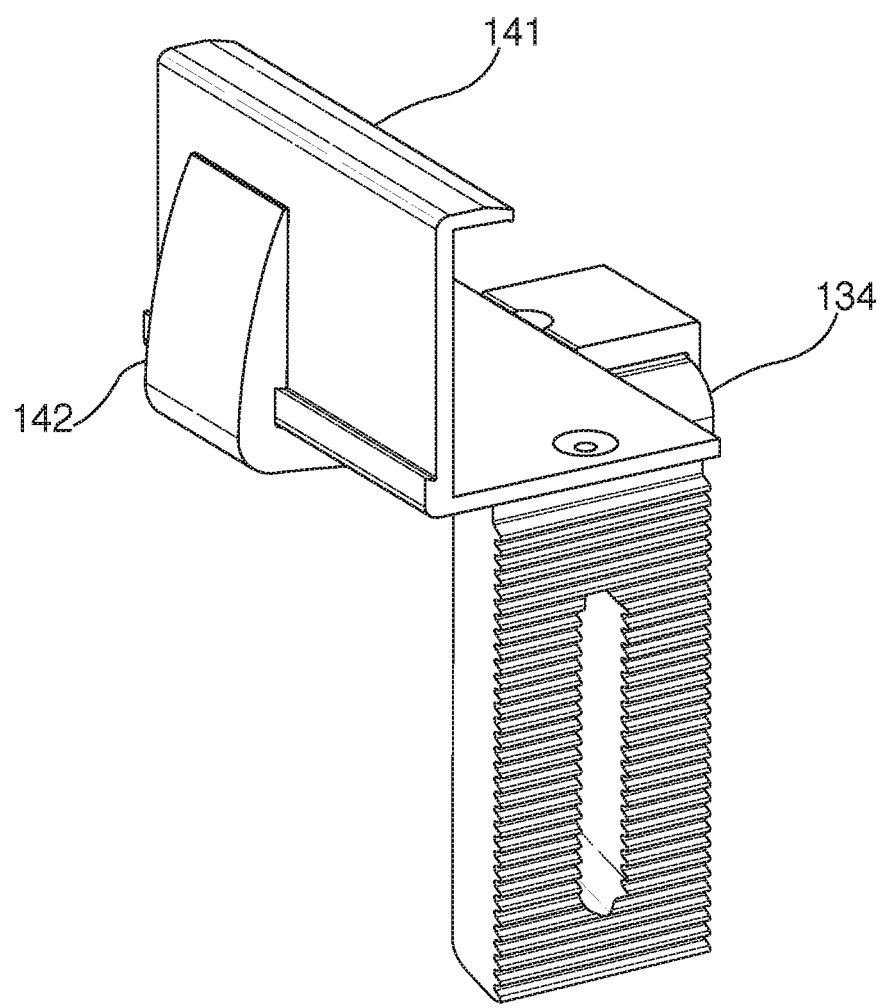
FIG. 4A shows a perspective view of an end-mount assembly installed on height-adjustable base assembly, in accordance with some embodiments.
Figure 4B:
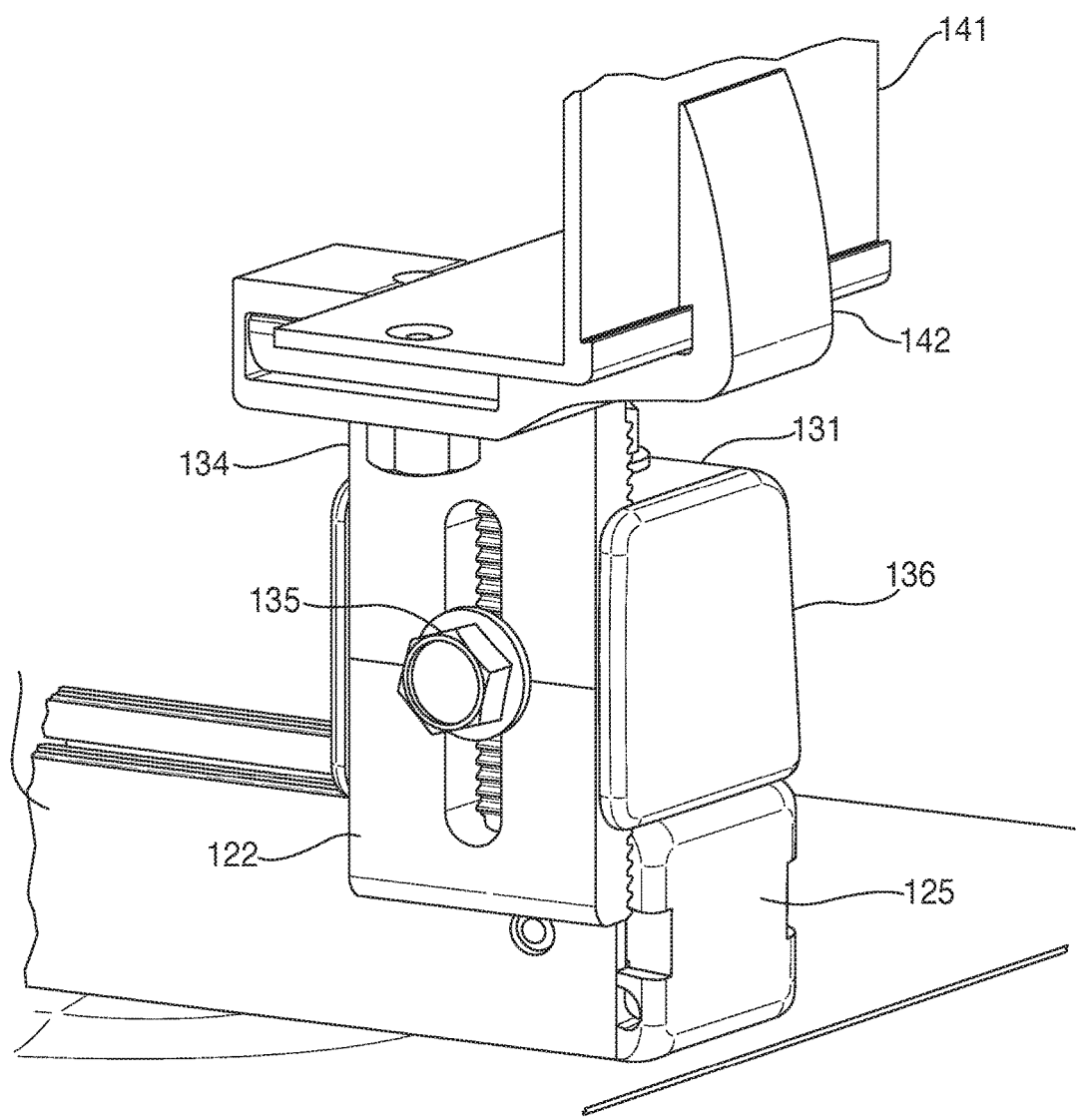
FIG. 4B shows a second perspective view of an end-mount assembly installed on height-adjustable base assembly, in accordance with some embodiments.
Figure 4C:
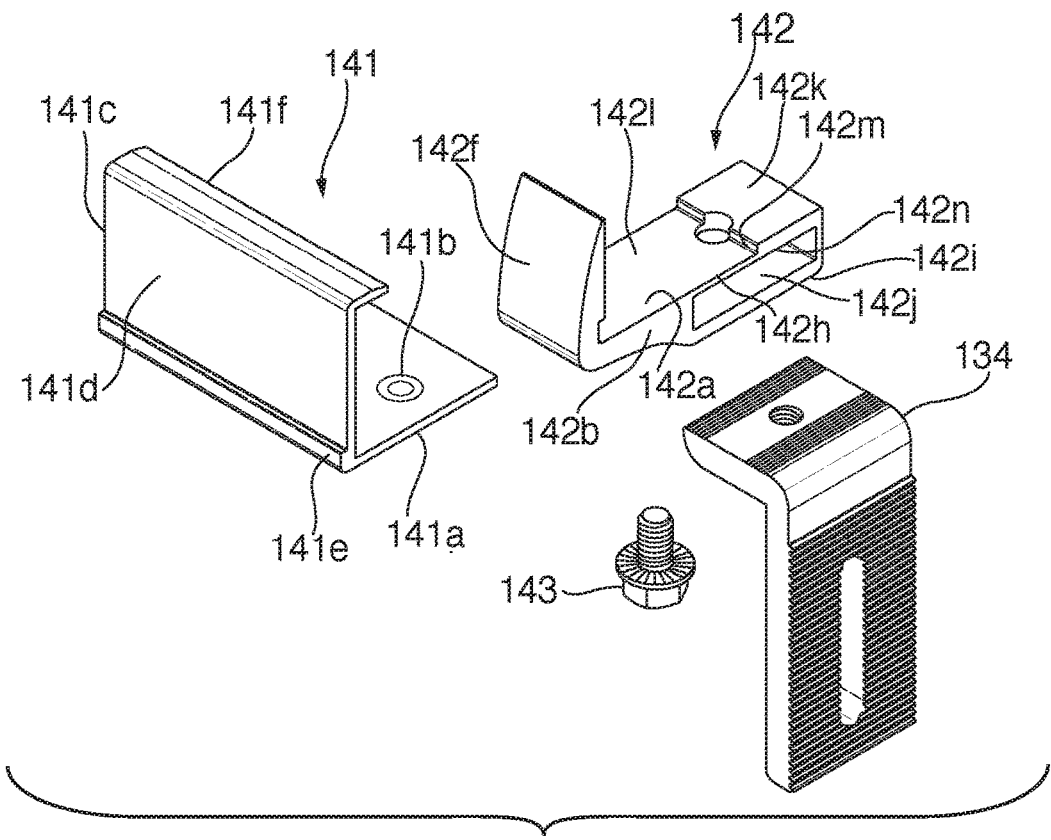
FIG. 4C shows an exploded, perspective view of an end-mount assembly, in accordance with some embodiments.
Figure 4D:
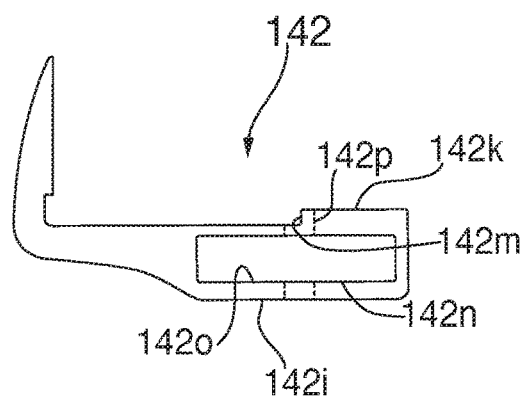
FIG. 4D shows a side view of an end-mount assembly, in accordance with some embodiments.
Figure 5A:
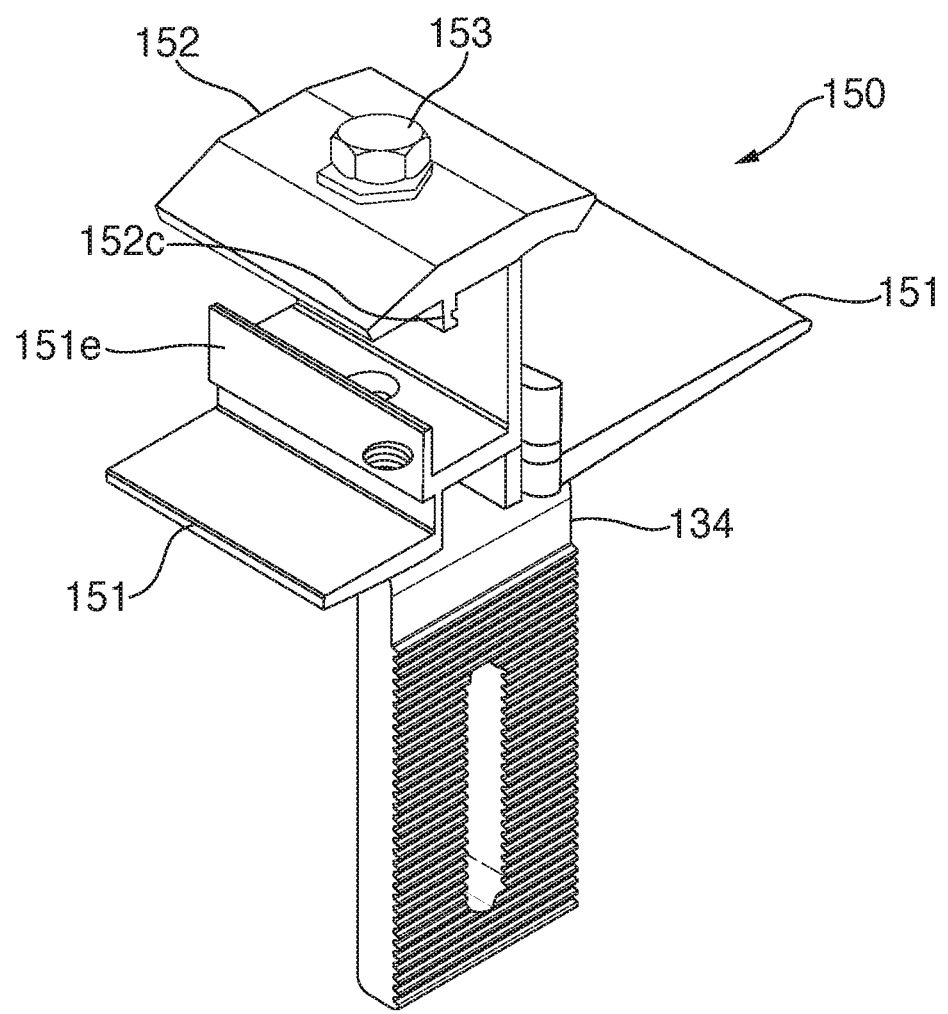
FIG. 5A shows a perspective view of mid-mount assembly installed on height-adjustable base assembly, in accordance with some embodiments.

Flashing 121 includes plate 121a, first raised portion 121b, second raised portion 121c located concentrically within first raised portion 121b, and an aperture 121d located concentrically within second raised portion 121c. Second raised portion 121c may be shaped to promote water-tight engagement between it and fastener 123. As shown in FIGS. 3A-3B, fastener 123 may be an umbrella lag screw. In such embodiments, first raised portion 121b may be configured to crush as flash track assembly 120 is being installed on installation surface 102. As first raised portion 121b is being crushed, second raised portion 121c presses upwards inside the dome of the umbrella lag screw to improve water-tightness. In all embodiments, gasket 124 may be provided between fastener 123 and flashing 121 as a further guard against ingress of water under flashing 121.

Flash track 122 may be generally configured in the shape of a C-channel. As installed on installation surface 102, the plane defined by base 122a may be substantially parallel to the plane of flashing 121. Walls 122b may extend substantially perpendicularly from base 122a and away from installation surface 102, as installed, and be arranged substantially parallel with one another. Flanges 122c may extend substantially perpendicularly from distal ends 122e of walls 122b, towards each other, and may run substantially parallel with one another in the same direction as walls 122b. In some embodiments, walls 122b and flanges 122c may be configured to couple with height-adjustable assembly 130. As installed, flash track 122 is preferably oriented substantially parallel to the slope of installation surface 102. For example, when installation surface 102 is a roof of a house on which solar modules 110 will be installed, the longitudinal dimension of flash track 122 will run from the down-roof side towards the uproof side of installation surface 102. This orientation of flash track 122 with respect to the installation surface permits for facile repositioning of other mounting system components (e.g. height-adjustable base assembly 130 and end-mount assembly 140 or mid-mount assembly 150) during installation.

Fastener 123 may be any suitable fastener for extending through the aperture of base 122a and securing flash track assembly 120 to installation surface 102. In some embodiments, fastener 123 is shaped to engage second raised portion 121c through gasket 124. Gasket 124 may include any compressible material that may be placed in between fastener 123 and second raised portion 121c to create a seal or impenetrable barrier to prevent a penetration of the rain and/or any other environmental element(s) through the aperture of the base 122a after flash track assembly 120 has been installed on installation surface 102. As shown in FIGS. 3A-3B, fastener 123 can be an umbrella lag bolt as described in U.S. Provisional Patent Application No. 62/381,175, entitled "Devices, Systems, and Methods for Watertight Securing of a Component to a Surface," filed Aug. 30, 2016, which is incorporated by reference herein in its entirety.

In some embodiments, one or more flash track end caps 125 may be used to cover the end(s) of flash track 122. Each flash track end cap 125 may include a cap base 125a and spring legs 125b which may extend substantially perpendicular from cap base 125a. As shown, each spring leg 125b may include track-engagement foot 125c configured to engage cap-engagement aperture 122d; likewise, cap-engagement aperture 122d may be configured to receive and retain track-engagement foot 125c. In some embodiments, flash track end caps 125 could prevent end-mount assembly 130 and/or mid-mount assembly 140 from sliding off flash track assembly 120 as discussed below.

FIGS. 3A-3B show perspective and side cross-sectional views, respectively, of height-adjustable base assembly 130, in accordance with some embodiments. Height-adjustable base assembly 130 may be configured to engage both flash track 122 of flash track assembly 120 and an assembly configured to engage solar module 110, such as end-mount assembly 140 or mid-mount assembly 150, for example. Height-adjustable track mount 130 can include a mount base 131, channel nut fastener 132, channel nut 133, leveler 134, and leveler fastener 135. In some embodiments, height-adjustable track mount 130 could include mount base end caps 136.

Mount base 131 may be generally cuboid-shaped and can include horizontal sides 131a and 131c and vertical sides 131b and 131d. When height-adjustable base assembly 130 is engaged with flash track 122, horizontal side 131a may be arranged against distal ends 122e of flash track 122 and run substantially parallel with flanges 122c. One surface of horizontal side 131a may include ridges 131e which may run substantially parallel with one another. Ridges 131e may be placed in between distal ends 122e of flanges 122c in order to prevent rotational and lateral movement of mount base 131 relative to flash track 122 when horizontal side 131a is placed against flanges 122c. Horizontal side 131a may include an aperture (shown by the dashed lines) through which channel nut fastener 132 may extend to engage with channel nut 133.

Vertical side 131b may extend substantially perpendicular away horizontal side 131a to horizontal side 131c. An outer surface 131f of vertical side 131b may be ribbed or otherwise textured to facilitate a slip-free coupling with leveler 134 when both are coupled together. Vertical side 131b may include an aperture (shown by the dashed lines) to facilitate the coupling. In some embodiments, such aperture may be configured with threads to threadably engage threads of leveler fastener 135 for the coupling of leveler 134 to mount base 131.

Horizontal side 131c may extend substantially perpendicular away vertical side 131b to vertical side 131d. Horizontal side 131c may include an aperture (not shown) through which channel nut fastener 132 may extend to engage (after extending through the aperture horizontal side 131a) with channel nut 133.

Vertical side 131d may extend substantially perpendicular away horizontal side 131a to horizontal side 131c. In some embodiments, an intersection of vertical side 131d and horizontal side 131c may be rounded as shown.

Channel nut 133 may include frame-engagement slots 131i to engage inner surfaces 122g of flanges 122c and aperture 133a to receive channel nut fastener 132. In some embodiments, aperture 133a may be threaded to threadably receive complementary threads of channel nut fastener 132. When threadably engaged, rotation of channel nut fastener 132 in a tightening direction causes channel nut 133 to approach flanges 122c until frame-engagement slots 131i are formed and the placement of channel nut 133 against inner surfaces 122g is secured with sufficient force.

Leveler 134 may be a structure generally configured as an L-shape to couple with mount base 131 and either module sleeve adapter 142 of end-mount assembly 140 or mid-mount bottom 151 of mid-mount assembly 150 as discussed in detail below. Leveler 134 may include a vertical member 134a, horizontal member 134b, slot 134c, and aperture 134d.

Outer surface 134e of vertical member 134a may have a ribbed or otherwise textured surface complimentary to the ribbed or otherwise textured surface of vertical side 131c to facilitate a slip-free coupling when leveler 134 is coupled with mount base 131. This coupling may be facilitated with leveler fastener 135 extending through slot 134c of vertical member 134a. Horizontal member 134b may include an aperture 134d, which facilitates coupling of horizontal member 134b to either module sleeve adapter 142 of end-mount assembly 140 or mid-mount bottom 151 of mid-mount assembly 150 as discussed below. In some embodiments, aperture 134d may include threads to threadably engage fastener 143 of end-mount assembly 140 or fastener 153 of mid-mount assembly 150.

FIGS. 4A-4D show first perspective, second perspective, exploded, and side views, respectively, of an end-mount assembly, in accordance with some embodiments. End-mount assembly 140 may be configured to couple to horizontal member 134b of leveler 134 and a solar module 110. End-mount assembly 140 can include module sleeve 141, module sleeve adapter 142, and end-mount fastener 143.

Module sleeve 141 may be generally configured in the shape of a J-channel to engage and retain solar module 110. Base 141a may run in a direction substantially parallel to installation surface 102 when installed. In some embodiments, base 141a may include one or more protrusions 141b extending in a direction towards module sleeve adapter 142, as installed. In some embodiments, protrusions 141b may be configured to facilitate an engagement between an installation/removal tool that could be employed by an installer during an installation/removal of a solar module 110. Protrusions 141b may also act as stops to prevent a sliding disengagement of module sleeve 141 from module sleeve adapter 142 after a sliding engagement has been attained.

Wall 141c may extend substantially perpendicular from base 141a and away from installation surface 102 when installed. An outer surface 141d of wall 141c may include ridge 141e at or near an intersection with base 141a that runs substantially parallel to installation surface 102 when installed. In some embodiments, ridge 141e may be configured to engage groove 142e of module sleeve adapter 142. Upper flange 141f may extend substantially perpendicular from wall 141c. Flange 141f may be configured to engage, or prevent vertical movement of, an upper surface of solar module 110 upon its installation and retain it in place within module 141 after its installation.

Module sleeve adapter 142 may be generally configured as an L-shaped structure to couple end-mount assembly 140 to leveler 134. Module sleeve adapter 142 may include a vertical member 142a and a horizontal member 142b. Vertical member 142a may extend substantially perpendicular from horizontal member 142b and away from installation surface 102 when installed. An inner surface of vertical member 142a may include a flange 142c to form groove 142e within which rail 141e may be placed. In some embodiments, an outer surface 142f of vertical member 142a may be narrowed as a smooth rounded surface until reaching a distal end 142g of vertical member 142a as shown.

Horizontal member 142b may extend substantially perpendicularly from vertical member 142a and parallel with installation surface 102 when installed. Horizontal member 142b may include upper surface 142h, lower surface 142i, and slot 142j formed within horizontal member 142b. Upper surface 142h of horizontal member 142b may include a flange 142k to form a channel 142l on inner surface 142h to facilitate placement and/or locking of module sleeve 132a in channel 142l in between groove 142e and an inner side 142m of flange 142k.

Slot 142*j* may include an inner surface 142*o* with an aperture 142*p* shared by outer surface 142*i*. Slot 142*j* may be configured to receive horizontal member 134*b* of leveler 134 inserted into slot 142*j* to a point where aperture 134*d* of horizontal member 134*b* becomes concentrically aligned with aperture 142*p*. End-mount fastener 143 may be extended through apertures 142*p* and 134*d* to couple inner surface 142*o* to horizontal member 134*b*. In some embodiments, end-mount fastener 143 may threadably engage aperture 134*d*.

Referring now to FIG. 4E, a sequence for a placement solar module 110 within module sleeve is shown left to right, where solar module 110 may be placed into channel 142*i* and slid towards wall 141*c* until contact with flange 141*f* is made. Then, solar module 110 may be rocked downwards while being further slid into channel 142*i* until solar module 110 is seated within module sleeve 141. The height of module sleeve (i.e. the distance between base 141*a* and upper flange 141*f*) is sufficient to permit solar module 110 to be rocked downward an into place as shown in FIG. 4E. Thus, as installed with solar module 110 resting on base 141*a*, a space will remain between the top of solar module 110 and upper flange 141*f*.

Referring now to FIGS. 5A-5D, mid-mount assembly 150 may be configured to engage both leveler 134 of height-adjustable track mount 130 and two or more solar modules (e.g., solar modules 110 of FIG. 1A). Mid-mount assembly 150 can include a mid-mount bottom member 151, mid-mount clamping member 152, mid-mount fastener 153, and mid-mount washer 154. In some embodiments, a spacer 155 may be included.

Mid-mount assembly 150 is designed to be laterally moveable along flash track 122 of flash track assembly 120. Thus, when a solar module is rocked downward into a module sleeve, such as module sleeve 141 positioned down-roof, mid-mount assembly 150 can be slid along flash track 122 until the solar module is retained between mid-mount bottom member 151 and mid-mount clamping member 152. The lateral adjustment of mid-mount assembly 150 may be effected by slightly disengaging mount base 131 from flash track (e.g. by loosening fastener 132 from its engagement from channel nut 131) and sliding height-adjustable track mount 130, to which mid-mount assembly 150 is coupled, along flash track 122 until mid-mount assembly engages the solar module.

Mid-mount bottom 151 may be a structure formed with two grooves 151*a* and 151*b* configured for engaging a ridge of either a module sleeve (e.g. module sleeve 141 of FIG. 4A) or a module link (e.g. module link 160 of FIG. 1C). Module sleeves and module links may be used in conjunction with mid-mount assembly when the location of a module link coincides with the location of a mid-mount assembly, such as in the case of a staggered solar module array. When mid-mount assembly 150 is installed away from such locations, neither module sleeves nor module links are required for installation, and mid-mount assembly directly contacts the solar modules.

Mid-mount bottom 151 may have upper portion and a lower portion. The upper portion may be formed in the shape of a J-channel formed with a base 151*c* and walls 151*d* and 151*e* extending perpendicularly away from base 151*c* in a direction away from the installation surface. Base 151*c* may be arranged in a plane substantially parallel to installation surface 102 when installed. In some embodiments, base 151*c* may include an aperture 151*f* to facilitate a coupling of mid-mount bottom 151 to leveler 134.

Walls 151*d* and 151*e* may extend substantially perpendicularly from base 151*c* and away from installation surface 102 when installed. An outer surface 151*f* of wall 151*e* may be a surface against which a first solar module 110 may be placed prior to solar module 110 being clamped into place by mid-mount clamping member 152. The placement of solar module 110 against outer surface 151*f* may be accomplished by sliding height-adjustable track mount 130, coupled with mid-mount assembly 140, toward solar module 110 until outer surface 151*f* reaches the solar module 110. An outer surface 151*g* of wall 151*d* may be a surface against which a second solar module 110 may be placed after the first solar module has been clamped into place.

The lower portion of mid-mount bottom 151 may be formed with two L-shapes, where a first L-shape may be formed with vertical member 151*h* and horizontal member 151*i*, and the second L-shape may be formed with vertical member 151*j* and horizontal member 151*k*. Vertical members 151*h* and 151*j* may extend substantially perpendicular from horizontal members 151*i* and 151*k*, respectively, and away from installation surface 102, when installed, until reaching outer surface 151*l* of base 151*c*. Horizontal members 151*i* and 151*k* may extend substantially perpendicularly from vertical members 151*h* and 151*j*, respectively, and substantially parallel with installation surface 102 when installed. As installed, a first solar module will rest atop horizontal member 151*i*, and a second solar module will rest atop horizontal member 151*k*.

Horizontal members 151*i* and 151*k* may include upper surfaces 151*m* and 151*n*, respectively, and lower surfaces 151*o* and 151*p*, respectively. Together with vertical members 151*h* and 151*j* and portions of outer surface 151*l* of base 151*c*, inner surfaces 151*m* and 151*n* form grooves 151*a* and 151*b*, respectively, as shown. In some embodiments, horizontal member 151*k* may be longer than horizontal member 151*i* to facilitate the installation of solar module 110 which includes setting solar module 110 on top of inner surface 151*n* and performing a rocking motion while moving solar module 110 until solar module 110 is placed against outer surface 151*g* of wall 151*d*.

Mid-mount clamping member 152 may include cap 152*a*, stop flange 152*b*, spring retaining flange 152*c*, and aperture 152*d*. Cap 152*a* may extend substantially parallel to installation surface 102, when installed, and includes aperture 152*d* through which mid-mount fastener 153 may extend. Stop flange 152*b* may be configured with a specific depth which may prevent tightening of mid-mount fastener 153 when a distal end 152*e* of flange 152*b* makes contact with upper surface 151*n* of base 151*c*.

Bonding clip retaining flange 153*c* may be configured with one or more notches 152*h* to receive and retain bonding clip 156 in place between mid-mount clamping member 152 and mid-mount bottom 151. Bonding clip 156 is an electrically conductive member with downwardly pointing teeth that are configured to puncture or scratch the surface of solar module frames, which are typically formed from anodized aluminum. Bonding clip 156 helps to maintain electrical continuity between the adjacent solar modules retained by mid-mount assembly 150.

Aperture 152*d* may be included in cap 152*a* to facilitate a coupling of mid-mount bottom 151 to leveler 134 of height-adjustable track mount 130. Fastener 153 may extend through aperture 152*d* and aperture 151*f* of mid-mount bottom 151 to perform the coupling of mid-mount bottom 151 to leveler 134. In some embodiments, fastener 153 may perform the coupling by threadably engaging aperture 134*d* configured with threads.

Lower surfaces 152e and 152f of cap 152d may not occupy the same plane. In some embodiments, lower surface 152f may be elevated above lower surface 152e by a distance 152g. As a result, the distance between lower surface 152f and inner surface 151n is greater than lower surfaces 152e and inner surface 151m to facilitate a placement of module sleeve 141 against outer surface 151g. This offset permits mid-mount top 152 to clamp down on the uproof side of a solar module while allowing a new solar module to be rocked into place with some clearance between the top of the solar module and lower surface 152f, as described above with respect to the end-mount. That is, the downroof side of a solar module may be rocked into the uproof facing side of mid-mount assembly 150 or end-mount assembly 140 while the uproof side of the solar module is clamped by lower surface 152e of mid-mount 150.

In some embodiments, mid-mount assembly 150 also includes spring 157, which may be rest on base 151c between walls 151d and 151e. Spring 157 can maintain mid-mount clamping member 152 at a distance from mid-mount bottom 151 until the installer is ready to install a solar module. Upon tightening fastener 153 into the threaded aperture of leveler 134, spring 157 compresses to allow mid-mount clamping member 152 to clamp down onto the solar module.

Figure 6A:
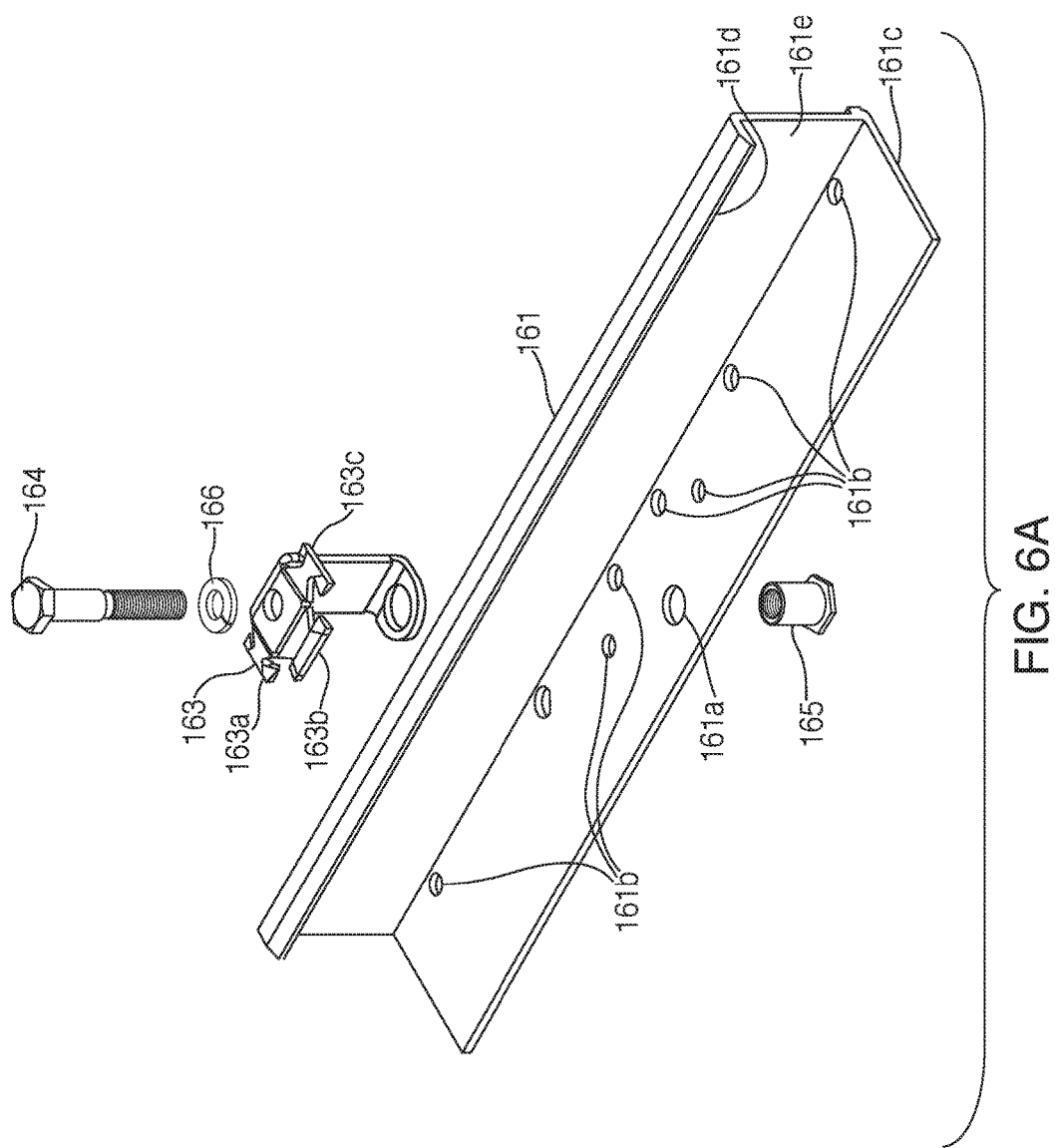
FIG. 6A shows an exploded perspective view of a clamping module link, in accordance with some embodiments.
Figure 6B:
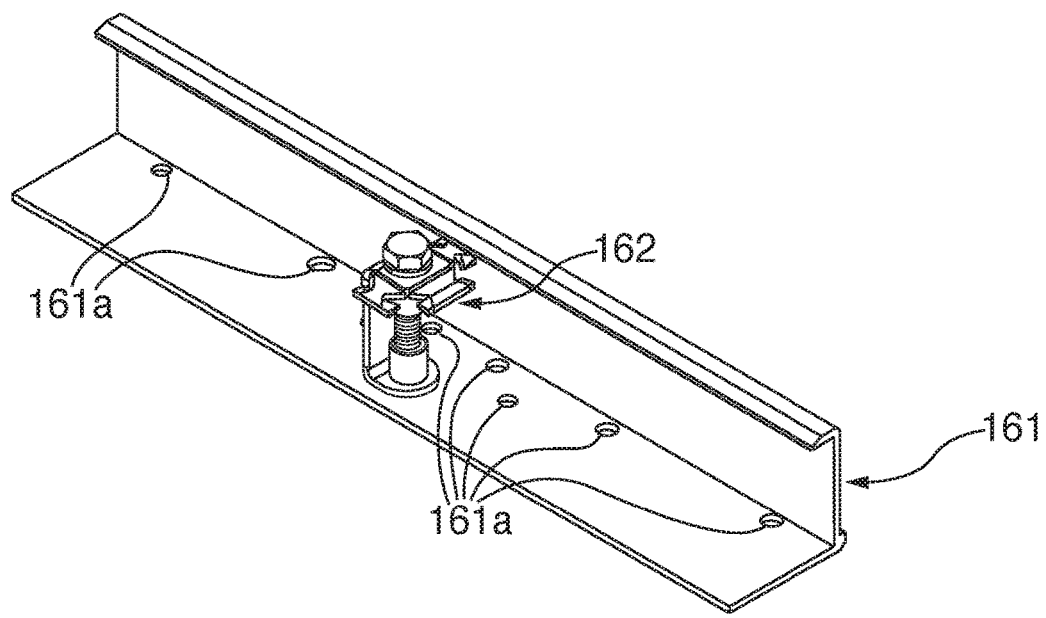
FIG. 6B shows an assembled perspective view of a clamping module link, in accordance with some embodiments.

FIG. 6A shows a perspective view of module link assembly 160, in accordance with some embodiments. As noted above, module links 160 may attach to the edges of solar module frames to provide structural coupling between adjacent solar modules. As depicted in FIG. 6A, module link 160 may include C-shaped linking member 161 that can generally surround one or more module frames on three sides in a nested configuration. Thus, the bottom surface of a module frame can rest atop lower flange 161c of module link 160, the top surface of the module frame can be arranged below upper flange 161d, and the lateral edge of the module frame can be inserted into module link. Module link 160 until it rests against vertical member 161e. Linking member 161 also includes drain holes 161b. The arrangement of drain holes 161b is preferably configured to match the drain hole configuration of one or more commercially-available or proprietary solar module frames. In some embodiments, linking member 161 also includes module link aperture 161a for receiving a clamp fastener, as described in more detail below.

In some embodiments, the dimensions of vertical member 161e may be sufficient to allow a solar module to be inserted into linking member 161 without contacting lower flange 161c and upper flange 161d simultaneously. Thus, while upper flange 161d would prevent an installed solar module from detaching from the array, the clearance between lower flange 161c and upper flange 161d permits module link 160 to be installed without requiring exacting manufacturing tolerances. In these embodiments, solar modules can be clamped to lower flange 161c to securely install module link 160 and attain structural coupling between adjacent solar modules in an array.

In some embodiments, module link 160 includes rotating clamping member 162, which is configured to clamp one or two solar modules against lower flange 161c. For this purpose, rotating clamping member 162 includes three clamp flanges 162a-162c arranged in a T-formation. When clamping a single solar module, rotating clamping member 162b, located at the center of the T-formation, can be used to clamp down on the edge of a solar module (as shown in FIG. 1D). Clamping one solar module at a time in this way permits a second solar module to be slid into place while maintaining module link 160 in place relative to the first solar module. Once the second solar module is in place, rotating clamping member 162 can be rotated such that clamp flanges 162a and 162c, located at the edges of the T-formation, clamp down on the first and second solar modules simultaneously. When installed, rotating clamping member 162 maintains constant spacing between adjacent solar modules.

In some embodiments, rotating clamping member 162 includes upper aperture 162d and lower aperture 162e for receiving clamping fastener 163. Clamping fastener 163 can extend through upper aperture 162d, lower aperture 162e, and module link aperture 161a in order to actuate and de-actuate clamping action on solar modules inserted into linking member 161. For example, clamping fastener 163 may threadably engage nut 165, such that tightening clamping fastener 163 into nut 165 results in downward pressure on clamp flanges 162a-162c and, thereby, clamping action on any solar modules located under the flanges. To relieve the clamping pressure to uninstall the solar modules, or to rotate clamping fastener 163 between single module engagement mode and double module engagement mode, clamping fastener 163 may be fully or partially disengaged from nut 165. In some embodiments, washer 164 may be interposed between the head of fastener 163 and clamping member 162.

As used herein, the term "embodiment" means an embodiment that serves to illustrate by way of example but not limitation. It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A solar module mounting assembly, comprising:
a flash track, comprising a base and two walls extending substantially perpendicularly from opposing sides of the base towards distal ends, wherein a longitudinal dimension of the flash track is defined in a direction parallel to both the base and the walls;
a height-adjustable base member coupleable and longitudinally repositionable with respect to the flash track, wherein the height-adjustable base member comprises a leveler and a tower comprising a lower horizontal wall, two vertical walls extending substantially perpendicularly from the lower horizontal wall, and an upper horizontal wall extending substantially perpendicularly between the two vertical walls and arranged substantially parallel to the lower horizontal wall, wherein the leveler is coupled to one of the walls of the flash track, and wherein the upper horizontal wall and the lower horizontal wall comprise apertures for receiving a height-adjustable base member fastener; and
a solar module retention member coupled to the leveler.

2. The solar module mounting assembly of claim 1, wherein the flash track comprises a flash track aperture that receives an installation surface fastener for fastening the flash track to an installation surface.

3. The solar module mounting assembly of claim 1, comprising:
a flashing configured to be interposed between the flash track and an installation surface, the flashing comprising a flashing aperture for receiving an installation surface fastener.

4. The solar module mounting assembly of claim 3, wherein the flashing aperture is volcano shaped and extends at least partially through the flash track aperture, and wherein the installation surface fastener comprises an umbrella lag bolt.

5. The solar module mounting assembly of claim 4, further comprising a gasket interposed between a head of the umbrella lag bolt and the volcano shaped flashing aperture.

6. The solar module mounting assembly of claim 1, wherein the tower comprises a cuboid-shaped tower.

7. The solar module mounting assembly of claim 1, wherein the flash track comprises two flanges located at the distal ends of the walls, and wherein the two flanges extend inwards towards each other.

8. The solar module mounting assembly of claim 7, further comprising:
a channel nut comprising a threaded aperture and two parallel grooves, wherein the threaded aperture threadably receives the height-adjustable base member fastener that couples the height-adjustable base member to the flash track, and wherein the parallel grooves engage the two flanges of the flash track when the height-adjustable base member fastener is tightened within the threaded aperture.

9. The solar module mounting assembly of claim 1, wherein the leveler is L-shaped.

10. The solar module mounting assembly of claims 1, wherein the leveler and the one of the vertical walls of the tower each comprises an aperture receiving a leveler fastener that couples the leveler to the one of the vertical walls.

11. The solar module mounting assembly of claim 10, wherein the leveler and the one of the vertical walls of the tower each comprises a complementarily textured mounting surface, wherein the complementarily textured mounting surfaces enhance engagement between the leveler and the one of the vertical walls, preventing lateral and rotational movement of the leveler with respect to the one of the vertical walls.

12. The solar module mounting assembly of claim 1, wherein the solar module retention member is an end-mount assembly comprising:
a module sleeve adapter coupled to the leveler; and
a module sleeve slidably received by the module sleeve adapter, wherein the module sleeve is configured to receive an edge of a solar module.

13. The solar module mounting assembly of claim 12, wherein the module sleeve adapter comprises two protrusions that act as stops to prevent sliding disengagement of the module sleeve from the module sleeve adapter.

14. The solar module mounting assembly of claim 12, wherein the module sleeve receives and retains a downroof side of the solar module.

15. The solar module mounting assembly of claim 12, wherein the module sleeve comprises a base, a vertical member extending substantially perpendicularly from the base, and an upper flange extending substantially perpendicularly from the vertical member, the vertical member separating the base and the upper flange by a distance that exceeds the thickness of the solar module.

16. The solar module assembly of claim 1, wherein the solar module retention member is a mid-mount assembly, comprising:
a mid-mount bottom member coupled to the leveler; and
a mid-mount clamping member coupleable to the mid-mount bottom member with a mid-mount fastener.

17. The solar module assembly of claim 16, wherein the mid-mount assembly comprises a first side configured to clamp down onto a first solar module and a second side configured to slidably receive a second solar module.

18. The solar module assembly of claim 16, wherein a first lower surface of the mid-mount clamping member is configured to clampingly engage and puncture the first solar module, and wherein a second lower surface of the mid-mount clamping member slideably accepts and scratches an upper surface of the second solar module.

19. The solar module assembly of claim 16, wherein the mid-mount fastener extends through apertures in the mid-mount clamping member and the mid-mount bottom member to couple the mid-mount assembly to the leveler.

* * * * *